April 16, 1968 J. W. RYAN 3,377,741
FLUID PRESSURE ACTUATED TRACK SYSTEM AND TOY VEHICLE
Filed June 21, 1965 5 Sheets-Sheet 1
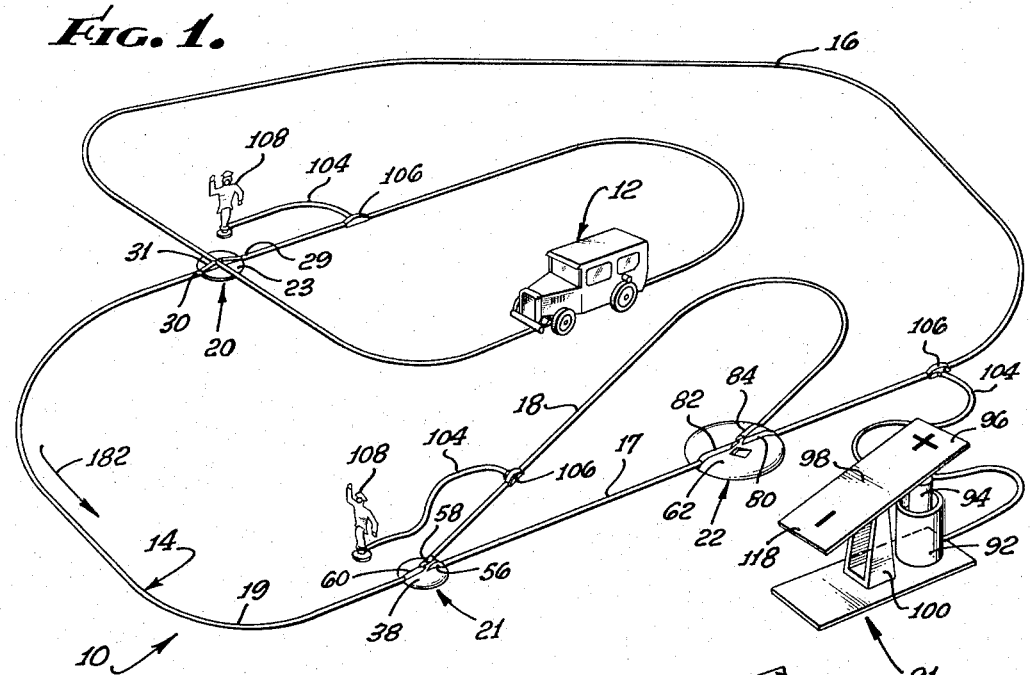
FIG. 1.
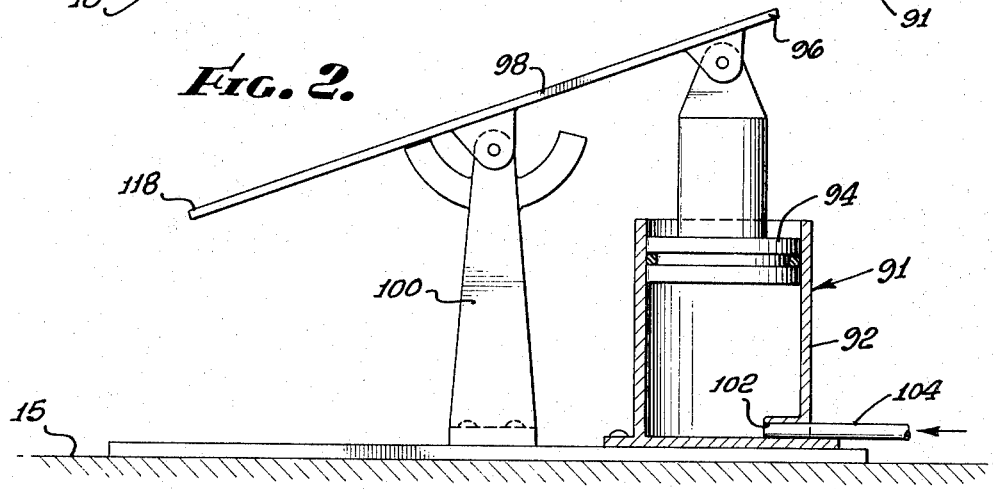
FIG. 2.
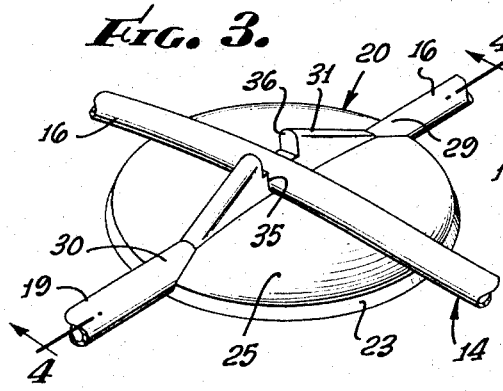
FIG. 3.
FIG. 4.
INVENTOR.
JOHN W. RYAN
By
Herzig, Walsh & Blackham
ATTORNEYS.

April 16, 1968 J. W. RYAN 3,377,741
FLUID PRESSURE ACTUATED TRACK SYSTEM AND TOY VEHICLE
Filed June 21, 1965 5 Sheets-Sheet 2
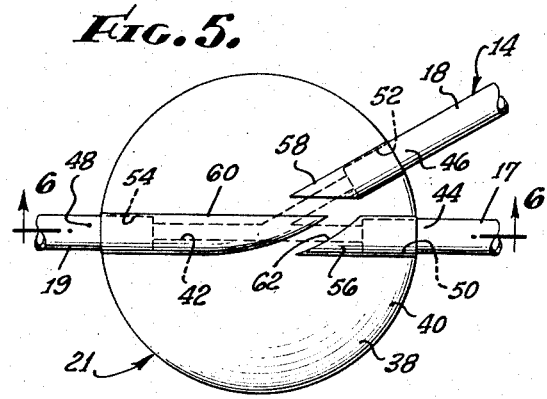
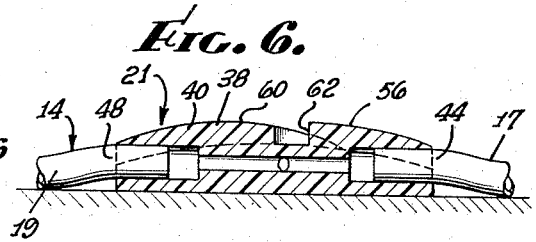
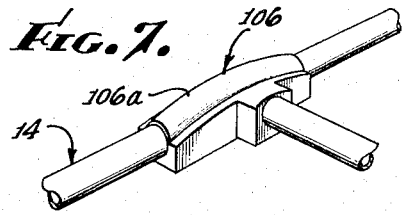
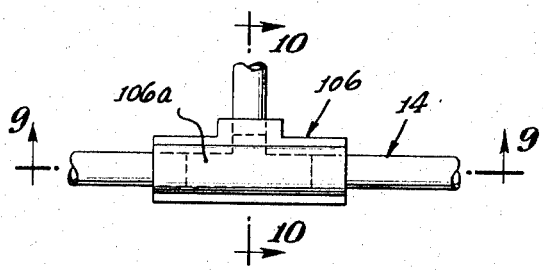
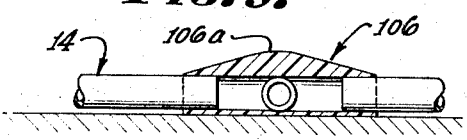
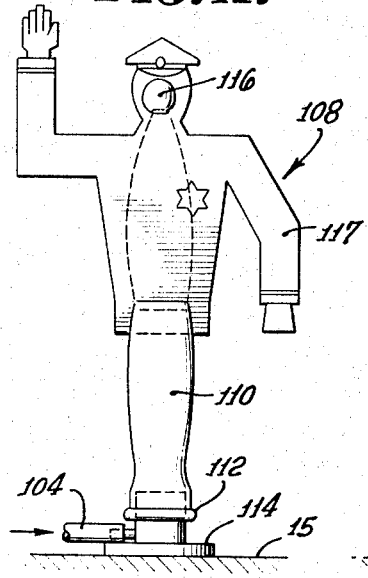
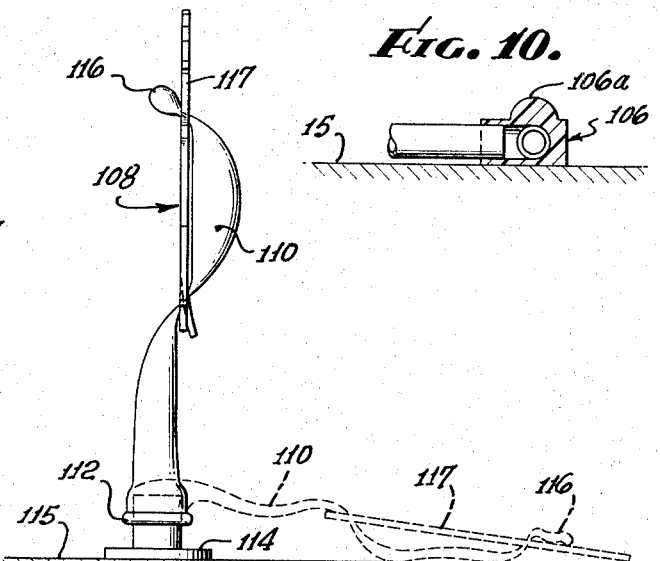
INVENTOR.
JOHN W. RYAN
By Herzig, Walsh & Blackham
ATTORNEYS.

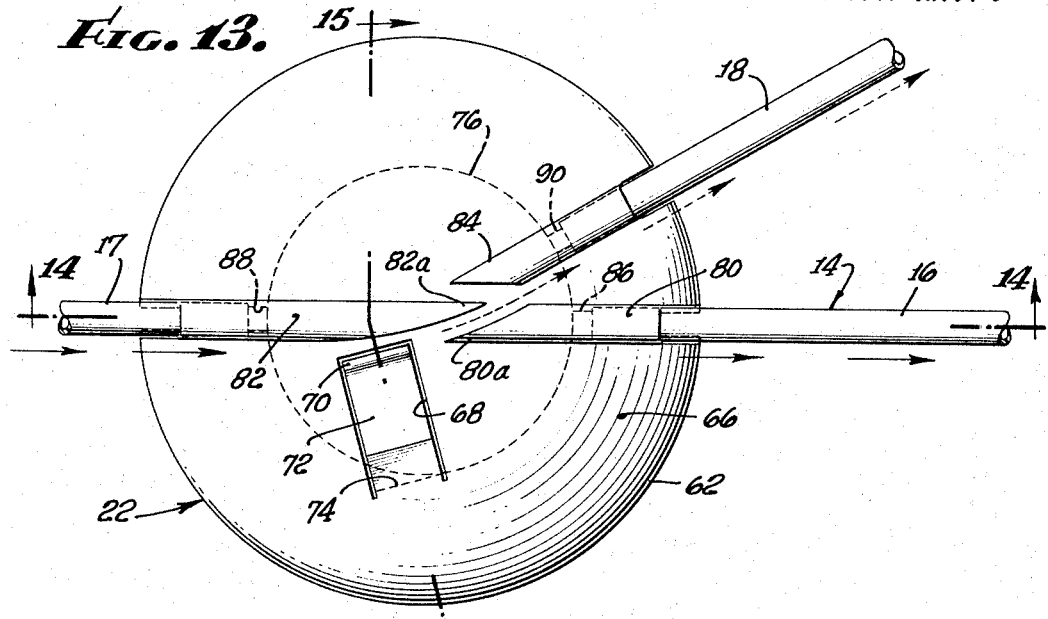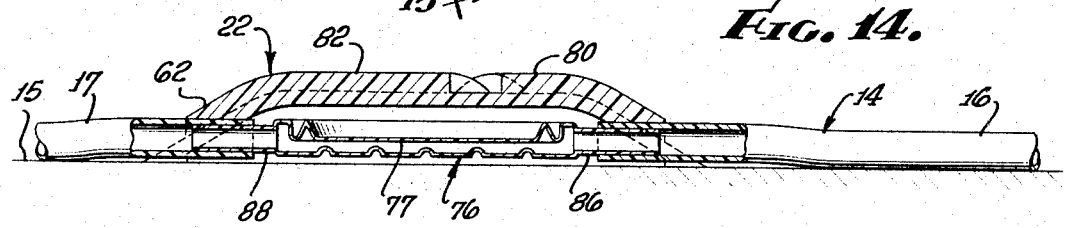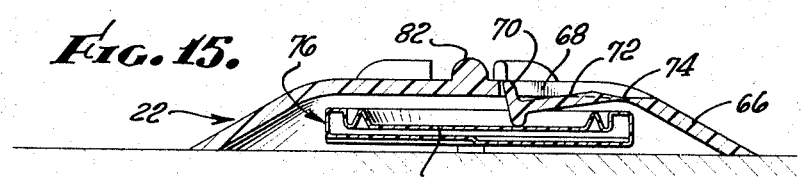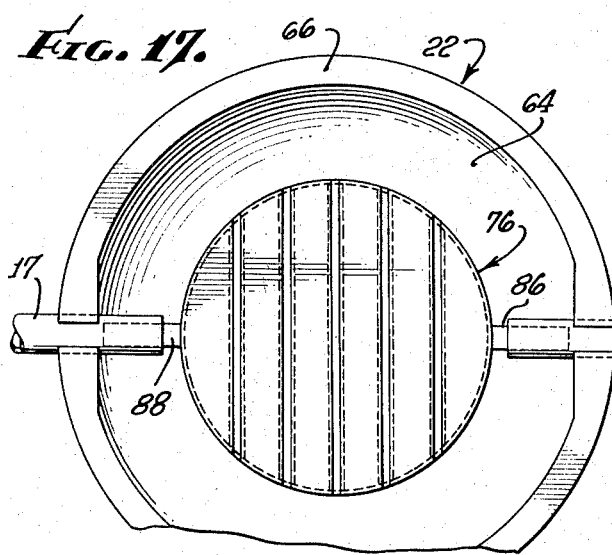

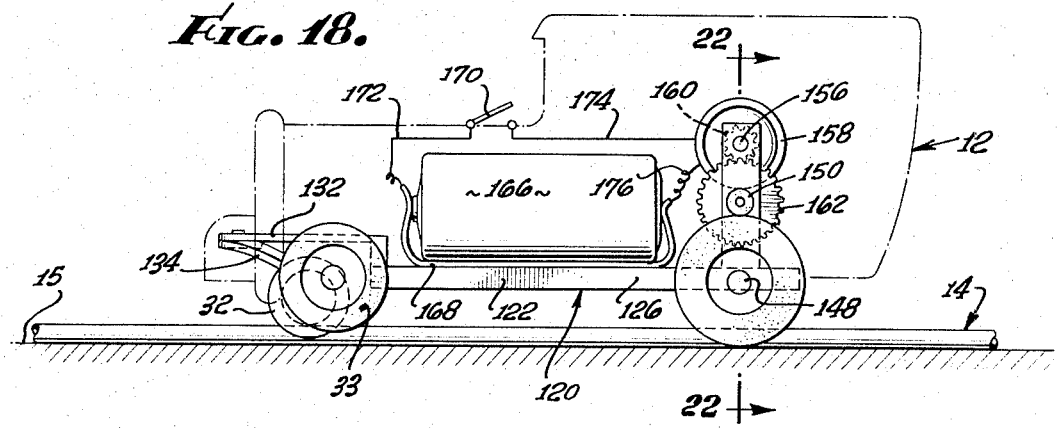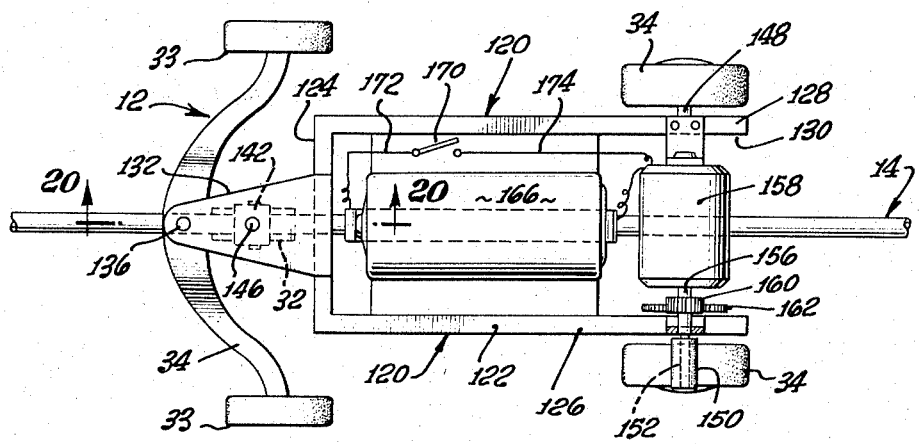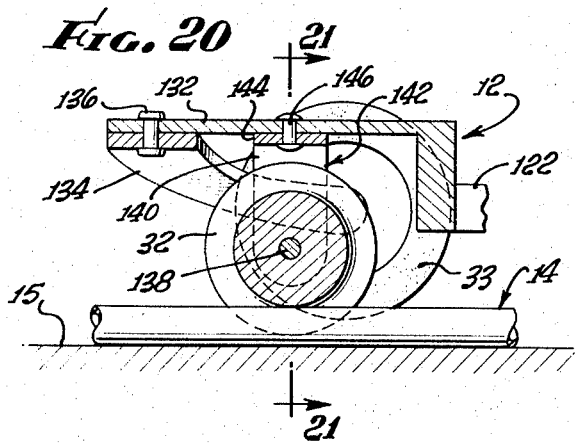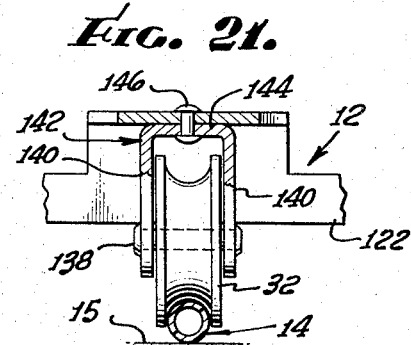

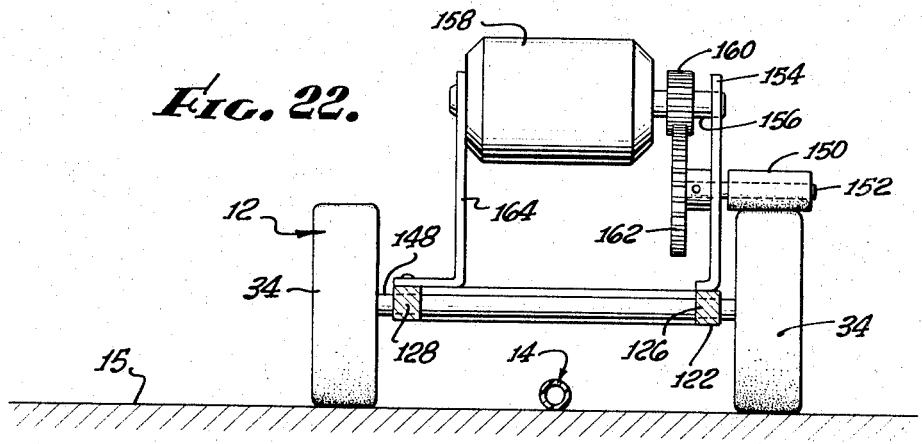
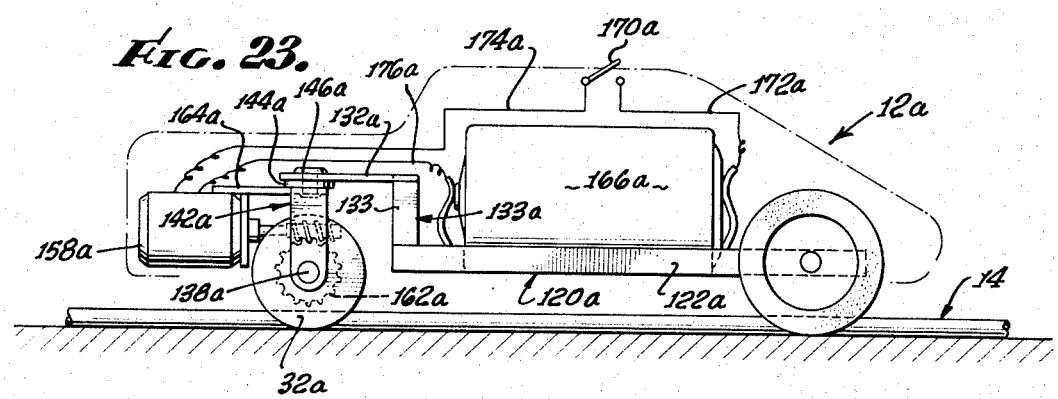
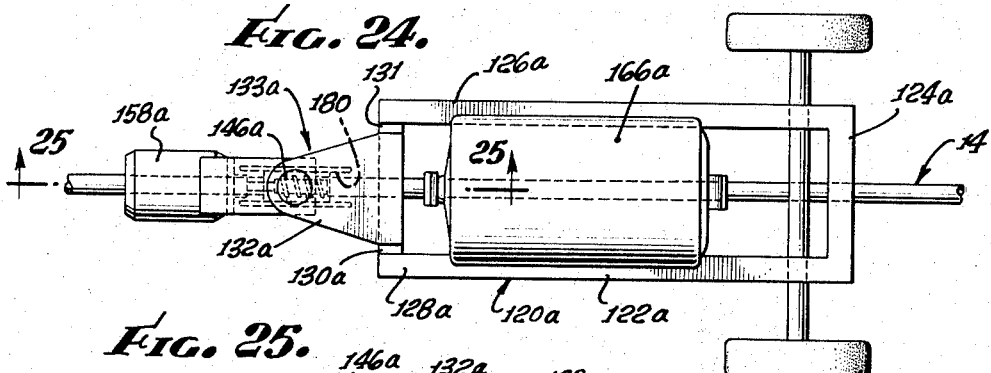
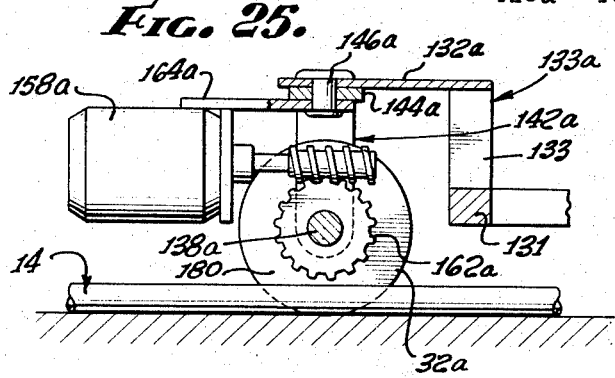

3,377,741
FLUID PRESSURE ACTUATED TRACK SYSTEM AND TOY VEHICLE

John W. Ryan, Bel Air, Calif., assignor to Mattel, Inc., a corporation of California
Filed June 21, 1965, Ser. No. 465,558
7 Claims. (Cl. 46—202)

ABSTRACT OF THE DISCLOSURE

A hollow flexible track of tubing capable of being laid out to define at least one closed path of travel and a toy vehicle having a wheel riding on the track to be guided around the path. The hollow track also serves as a closed fluid pressure system to which pneumatic switches, trackside accessories and such devices can be connected for operation. A manually operable pump is also connected to the closed system for applying pressure therein to operate the devices connected to the track.

---

The present invention relates to a new and useful track system and toy vehicle and more particularly to a pliable track system adapted to be placed on a supporting surface and contoured by hand to define a predetermined course having a plurality of paths which may be selectively travelled by the toy vehicle by actuating a new and useful fluid-actuated switching means of the present invention.

Although prior art pliable track systems are known, they do have certain disadvantages. A disadvantage with one such system resides in the fact that the system includes only one loop defining a predetermined course having but a single path.

Certain other prior art track systems having a plurality of loops defining a plurality of paths have the disadvantage that switching from one loop to another can only be accomplished by manually moving the vehicle against a fixed switching member.

Other prior art systems include movable switching means, but have the disadvantage that the switching must be done manually by physically moving a switching element from one path to another.

Yet another disadvantage with prior art pliable track systems resides in the fact that two independent systems cannot be quickly and easily connected together.

A further disadvantage with certain other prior art track systems resides in the fact that the toy vehicles designed for use with such systems have difficulty negotiating tight turns and have inadequate drive means.

In view of the foregoing factors and conditions characteristic of prior art pliable track systems and toy vehicles, it is a primary object of the present invention to provide a new and useful pliable track system and toy vehicle not subject to the disadvantages enumerated above and having remote control means for automatically switching a toy vehicle from one path to another efficiently, safely and expeditiously.

Yet another object of the present invention is to provide a new and useful remotely controlled, fluid-actuated switching system for a toy-vehicle track system.

A further object of the present invention is to provide vehicle directing means for directing a toy vehicle from one path to another path on a track system defining a predetermined course.

A still further object of the present invention is to provide a track system for toy vehicles wherein fluid-carrying conduits are adapted to serve the dual functions of guiding a toy vehicle along a predetermined course and of supplying fluid to switching means for switching said vehicle from one path to another path on said predetermined course.

Another object of the present invention is to provide a new and useful toy vehicle for use on a pliable track system.

According to the present invention, a track system is provided for guiding a toy vehicle along a plurality of paths. The track system includes a pliable member adapted to be placed upon a supporting surface and contoured by hand to form a predetermined course having a plurality of paths for the vehicle.

Vehicle directing means are movably mounted on the track system for directing the toy vehicle from one path to another path upon being moved into the path of travel of the vehicle for engagement therewith. Switching means are connected to the directing means for moving the directing means into the path of travel of the vehicle, whereby the vehicle will engage the directing means and be directed from one path to another.

In a preferred form of the invention, remote control means is connected to the switching means for controlling the operation thereof from a remote location. The switching means comprises a fluid-actuated member connected to the directing means for actuation by fluid supply means of the present invention.

The track system may include fluid carrying conduits for both guiding the vehicle along the paths and for supplying the fluid to the fluid-actuated member.

Two embodiments of a toy vehicle of the present invention are provided. One embodiment comprises an articulated, 3-wheeled vehicle having horizontally-disposed pivot means connecting a castered, powered drive-wheel to a vehicle body portion. The drive wheel is shaped like the sheeve of a pulley so that it will follow a pliable track of the present invention.

The other embodiment comprises a four-wheeled vehicle having a fifth, castered wheel engageable with the track to guide the vehicle. Improved drive means are provided for minimizing resistance through the vehicle driving motor when the vehicle negotiaates curves.

The features of the present invention which are believed to be novel are set forth with particularity in the appended claims. The present invention, both as to its organization and manner of operation, together with further objects and advantages thereof, may best be understood by reference to the following description and the accompanying drawings wherein like reference characters refer to like elements in the several views.

In the drawings:

FIGURE 1 is a perspective view of a track system of the present invention;

FIGURE 2 is an enlarged, elevational view with parts shown in cross section, of a fluid supply means shown in the system of FIGURE 1;

FIGURE 3 is an enlarged perspective view of a connector means for the track system of FIGURE 1;

FIGURE 4 is an enlarged, cross-sectional view taken along line 4—4 of FIGURE 3;

FIGURE 5 is an enlarged plan view of a switching means for the track system of FIGURE 1;

FIGURE 6 is a cross-sectional view taken along line 6—6 of FIGURE 5;

FIGURE 7 is an enlarged perspective view of a T-connector used in the track system of FIGURE 1;

FIGURE 8 is a plan view of the T-connector of FIGURE 7;

FIGURE 9 is a cross-sectional view taken along line 9—9 of FIGURE 8;

FIGURE 10 is a cross-sectional view taken along line 10—10 of FIGURE 8;

FIGURE 11 is an enlarged elevational view of an accessory used in connection with the track system of FIGURE 1;

FIGURE 12 is a side view of the accessory of FIGURE 11;

FIGURE 13 is an enlarged plan view of another switching means used in connection with the track system of FIGURE 1;

FIGURE 14 is a cross-sectional view taken along line 14—14 of FIGURE 13;

FIGURE 15 is a cross-sectional view taken along line 15—15 of FIGURE 13;

FIGURE 16 is a partial cross-sectional view similar to FIGURE 15 showing the relative positions of certain parts thereof upon pressurization of the track system of FIGURE 1;

FIGURE 17 is a bottom view of the switching means of FIGURE 13;

FIGURE 18 is an elevational view of a first embodiment of a toy vehicle which may be operated on the track system of the present invention;

FIGURE 19 is a plan view of the vehicle of FIGURE 18;

FIGURE 20 is an enlarged cross-sectional view taken along line 20—20 of FIGURE 19;

FIGURE 21 is a cross-sectional view taken along line 21—21 of FIGURE 20;

FIGURE 22 is an enlarged cross-sectional view taken along line 22—22 of FIGURE 18;

FIGURE 23 is an elevational view of a second embodiment of a toy vehicle which may be used on the track system of the present invention;

FIGURE 24 is a plan view of the toy vehicle of FIGURE 23; and

FIGURE 25 is an enlarged cross-sectional view taken along line 25—25 of FIGURE 24.

Referring again to the drawings a track system constituting a presently preferred embodiment of the invention, generally designated 10, guides a toy vehicle 12 on a predetermined course. The system 10 includes a pliable tubular member 14 adapted to be placed on a suitable supporting surface 15 and contoured by hand to form the predetermined course. A plurality of paths may be provided in the predetermined course by connecting separate lengths or sections 16, 17, 18 and 19 of the pliable member 14 together by suitable connecting means, such as those shown at 20, 21 and 22.

The connecting means 20 includes a disc-like member 23 having a substantially flat bottom surface 24 and a somewhat convex upper surface 25. The member 23 is provided with a bore 26 and counterbores 27 and 28 in communication with each other. An end 29 of section 16 and an end 30 of section 19 are placed in fluid communication with each other by mounting them in the counterbores 27 and 28, respectively. The member 23 is also provided with a vehicle directing member 31 for directing the vehicle 12 from section 16 to section 19 or from section 19 to section 16, depending on the direction of travel of the vehicle 12. This is accomplished by causing the vehicle's castered wheel 32 to follow the pliable member 14 and the directing member 31 while the front wheels 33 and rear wheels 34 of the vehicle 12 straddles the connecting means 20. The directing member 31 includes a saddle 35 which receives an intermediate portion of the section 16 and maintains that portion at a right angle to the directing member 31. The saddle 35 includes an upper portion 36 which is wider than the lower portion 37 thereof to accommodate the wheel 32 during travel of vehicle 12 along a path which crosses the member 23 at right angles to the directing member 31.

The connecting means 21 includes a disc-like member 38 having a substantially flat bottom surface 39 and a somewhat convex upper surface 40 and is provided with a Y-shaped passageway 42 for placing the sections 17, 18 and 19 in fluid communication with each other by inserting their ends 44, 46 and 48 into counterbores 50, 52 and 54, respectively, provided in the member 38. Vehicle directing members 56, 58 and 60, respectively, are provided on the upper surface 40 of the member 38 for directing the vehicle 12 from section 18 to section 19, from section 17 to section 19 or from section 19 to section 17, depending upon the direction the vehicle 12 is travelling. The directing member 56 includes a beveled portion 62 which is engageable by the wheel 32 when the vehicle 12 approaches member 38 along section 18 to turn the wheel 32 into alignment with the directing member 60 so that vehicle 12 will be directed from section 18 to section 19.

The connector means 22 includes a housing 62 having a bottom wall 64 and a top wall 66. The top wall 66 is provided with a rectangular slot 68 through which a vehicle directing member 70, forming a portion of a vehicle directing means 72, is adapted to pass from a position subjacent the track system 10 to a position adjacent the track member 14. A hinge member 74 is formed in the top wall 66 to permit the vehicle directing means 72 to swing from its subjacent position (FIGURE 15) to its adjacent position (FIGURE 16). Operation of the vehicle directing means 72 is controlled by a fluid-actuated switching means 76 which may comprise a chamber having a flexible wall 77. The fluid-actuated switching means 76 is mounted in the bottom wall 64 and has its wall 77 contacting the directing means 72. Pressurization of the fluid-actuated switching means 76 causes the means 72 to swing from its FIGURE 15 position to its FIGURE 16 position, thereby bringing the member 70 into position on the track system 10. Conversely, depressurization of the means 76 causes the directing means 72 to return to the position shown in FIGURE 15 wherein the means 70 is positioned subjacent the track system 10.

Hollow, transitional track means 80, 82 and 84 are provided on the top wall 66, for reception of the lengths 16, 17 and 18, respectively, of the pliable track member 14. Suitable conduit means 86, 88 and 90 are provided in the housing 62 for connecting the transitional track means 80, 82 and 84, respectively, in series communication with each other through the fluid-actuated switching means 76.

Fluid-actuated switching means 76 might, in presently less preferred embodiments, comprise a bellows or piston adapted to actuate a switch. Such means may also be utilized to actuate toy accessories other than switches, such as power take-off means operative by engagement with the vehicle.

The switching means 76 is easily straddled by the wheels 33 and 34 of vehicle 12 and is operated remotely by a remote control means 91 which includes an air cylinder 92 having a piston 94 reciprocally mounted therein. The piston 94 is connected to one end 96 of a treadle 98 which, in turn, is pivotally connected intermediate its ends to a base plate 100. Pushing on the end 96 causes piston 94 to move downwardly in cylinder 92 forcing air under pressure therefrom through outlet 102. A conduit 104 connects outlet 102 to the pliable tubular member 14 through a hollow T-connector 106 having a vehicle directing member 106a provided thereon. Since, the sections 16, 17, 18 and 19 are all in fluid communication with each other through the connecting means 20, 21 and 22, the air under pressure from outlet 102 pressurizes the entire system 10. Thus, the pliable member 14 serves the dual role of providing guide means for the vehicle 12 and of providing conduit means for the fluid supplied from the control means 91.

Various fluid-actuated accessories may be incorporated into the track system 10. For example, by way of illustration, but not of limitation, a pair of inflatable, simulated policemen 108 may be connected to the tubular member 14 by additional T connections 106 and conduits 104. Each policeman 108 includes an inflatable balloon 110 having its mouth 112 connected to a hollow pedestal 114. The closed end 116 of the balloon is threaded through a cut-out figure 117 representing the upper half of a policeman and becomes the policeman's nose. to the figure 117 in such a manner that the policeman stands erect when the balloon is inflated and falls to the broken line position shown in FIGURE 12 when the balloon 110 is deflated. Pushing on end 96 of treadle 98 inflates each balloon 110 by pumping air thereto through outlet 102, its associated conduit 104 and T-connector 106, and tubular member 14 and the T-connectors 106 and conduits 104 associated with the balloons 110. The balloons 110 may be deflated by pushing on end 118 of treadle 98 to evacuate cylinder 92.

Referring now to FIGURES 18–22, the vehicle 12 includes a chassis 120 having a substantially U-shaped frame member 122 which includes a bight portion 124, parallel, spaced-apart arms 126, 128 and an open end 130. A horizontally-extending wheel supporting bracket 132 is rigidly affixed to the bight portion 124 for pivotally supporting the front wheels 33 and the castered wheel 32. The front wheels 33 are rotatably mounted on an axle 134 which is pivotally connected to the bracket 132 by a pin 136. The castered wheel 32 is rotatably mounted on an axle 138 between the arms 140 of a U-shaped member 142 having its bight portion 144 pivotally connected to the bracket 132 by a pin 146. The castered wheel 32 supports the front of the vehicle 12 on the tubular member 14 in such a manner that the front wheels 33 are carried above the surface 15, as shown in FIGURES 18 and 20.

The rear wheels 34 are non-rotatably mounted on a rear axle 148 which is rotatably mounted in the open end 130 of frame 122. The rear wheels 34 are driven by a friction wheel 150 which engages the upper surface of one wheel 34 as distinguished from engaging the front surface of the wheel, as is the case in certain prior art vehicles. Power consumption on curves is increased when the front portion of the rear wheel is engaged by the friction wheel because the vehicle does not have differential gearing. The friction wheel 150 is carried by a shaft 152 which is rotatably mounted in a bracket 154. The bracket 154 is affixed to arm 126 of frame 122 and also supports the output shaft 156 of an electric motor 158. The output shaft 156 rotates a gear 160 which drivingly engages a gear 162 keyed to shaft 152 for imparting a driving torque to friction wheel 150. The motor 158 is also supported by a bracket 164 which is affixed to arm 128 of frame 122. Power is supplied to motor 158 by a dry-cell 166 which is supported in frame 122 by a bracket 168 and which is connected to motor 158 through a switch 170 by leads 172, 174 and 176.

A modified vehicle 12a is shown in FIGURES 23–25. The vehicle 12a includes a chassis 120a. The chassis 120a in turn, includes a substantially U-shaped frame member 122a having a bight portion 24a parallel, spaced-apart arms 126a and 128a and an open end 130a. A horizontal bar 131 is mounted in the open end 130a for supporting an upstanding portion 133 of a wheel supporting member 133a which includes a horizontally disposed member 132a.

An electric motor 158a is carried by a bracket 164a and is swingably connected by a pin 146a to the horizontal member 132a. A castered wheel 32a is rotatably mounted by an axle 138a in a U-shaped member 142a having a bight portion 144a pivotally connected to the pin 146a. The wheel 32a is provided with an annular recess 180 which engages the pliable track member 14 to guide the vehicle 12a along the predetermined course defined thereby.

A ring gear 162a is rotatably mounted on the axle 138a inside the wheel 32a and is rigidly affixed to the wheel 32a for imparting rotation thereto when ring gear 162a is rotated by a worm gear 160a keyed to the output shaft 156a of the electric motor 158a. Power may be supplied to the motor 158a by a suitable battery means, such as a dry cell 166a, which is mounted on the chassis 120a and which is connected to the motor 158a through a switch 170a by suitable electrical leads 172a, 174a and 176a. The chassis 120a supports a rear axle 148a which carries rear wheels 34a. The wheels 34a straddle the track member 14 and the connector means 20, 21 and 22 to follow the path taken by the castered wheel 32a.

In use, the vehicle 12 may be placed on section 19 of the track system 10 with the front of the vehicle headed in the direction of arrow 182 so that the vehicle 12 will travel around the pliable member 14 in a counterclockwise direction, as viewed in FIGURE 1. As the vehicle 12 moves along the course defined by the length 19 of the pliable member 14, the vehicle 12 will straddle and pass over connector means 21 and move onto section 17 along which it will travel to connector means 22. At this point, if the directing member 70 is in its subjacent position, the end 82a of track means 84 will direct the wheel 32 of vehicle 12 into engagement with the end 80a of the track means 80 causing the vehicle 12 to take a path defined by the length 16 of the pliable member 14. The direction member 70 is in its raised position, it will turn wheel 32 toward section 84 directing the vehicle 12 onto section 18.

While the particular track system and toy vehicles herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:

1. A toy comprising; a hollow generally tubular flexible track means the interior of which defines a normally closed hollow space, said track means being arranged to define at least one path of travel; a vehicle having means engaging with said track means for guiding said vehicle along said path; selectively operable means communicating with said hollow space for changing the fluid pressure therein; and further means communicating with said hollow space and having a movable element movable in response to a predetermined change in fluid pressure in said hollow space.

2. A toy as defined in claim 1 wherein said movable element is movable into the path of movement of a portion of said vehicle and engageable thereby to change the normal operation of said vehicle.

3. A toy as defined in claim 2 wherein said track is arranged to define different intersecting path portions, said movable element comprising a switch element arranged to selectively direct said vehicle from one to another of said path portions at their intersection.

4. A toy as defined in claim 3 wherein said movable element is movable upwardly to engage the means on said vehicle which guidingly engage said track.

5. A toy as defined in claim 1 wherein said means for changing the fluid pressure in said space comprises a selectively operable fluid pump communicating with said space at one point along said path.

6. A toy as defined in claim 1 wherein said further means is a display device positioned clear of the path of travel of said vehicle, said movable element comprising a portion of said device and being movable to change the appearance thereof.

7. A toy as defined in claim 1 wherein said means engageable with said track for guiding said vehicle comprises a castor wheel on said vehicle and arranged to roll on said track, gear means drivingly connected to said wheel, and a power driven worm gear drivingly engaging said gear means.

References Cited

UNITED STATES PATENTS

| | | | |
|---|---|---|---|
| 556,080 | 3/1896 | Ashby | 46—1 |
| 1,080,363 | 12/1913 | Miller | 246—415 |
| 2,167,245 | 7/1939 | Lohr | 46—210 |
| 2,574,067 | 11/1951 | Seidman | 46—202 |
| 2,575,055 | 11/1951 | Jaeger | 46—202 |
| 2,690,626 | 10/1954 | Gay et al. | 46—243 |
| 3,016,024 | 1/1962 | Silver | 46—243 |
| 3,148,478 | 9/1964 | Miller | 46—243 |

FOREIGN PATENTS 445,595    1/1935    Great Britain.

ANTON O. OECHSLE, *Primary Examiner.*

F. BARRY SHAY, *Examiner.*

T. ZACK, *Assistant Examiner.*